United States Patent

Talmadge

[15] 3,647,074

[45] Mar. 7, 1972

[54] RECORD RACK

[72] Inventor: Arthur Talmadge, 15 Richbell Road, Scarodale, N.Y. 10583

[22] Filed: Mar. 3, 1971

[21] Appl. No.: 120,445

[52] U.S. Cl. ....................211/40

[51] Int. Cl. ....................A47b 81/06

[58] Field of Search ....................211/40; 312/20, 10, 14

[56] References Cited

UNITED STATES PATENTS 3,027,012 3/1962 Talmadge ....................211/40

*Primary Examiner*—Roy D. Frazier
*Assistant Examiner*—Abraham Frankel
*Attorney*—Amster & Rothstein

[57] ABSTRACT

A record rack display assembly for displaying 45 r.p.m. records within their individual paper protective jackets. A backing member is provided with a plurality of projecting spindles for mounting 45 r.p.m. records in a vertical plane. Each spindle has an associated pin member disposed below said spindle a distance equal to slightly more than the radial length of said records so that the paper protective jackets which are slightly larger than the diameter of the records rest on said associated pin member.

3 Claims, 5 Drawing Figures

PATENTED MAR 7 1972

3,647,074

INVENTOR.
ARTHUR TALMADGE
BY
Amster & Rothstein
ATTORNEYS

RECORD RACK

This invention relates to a record rack construction and more particularly pertains to a record rack in which 45 r.p.m. records may be displayed within their individual protective jackets in a fixed, nonrotatable position in a vertical plane.

"Single" phonograph records denote the popular records which have one selection on each side of the record. These are the records most often used for current popular music and are now almost exclusively 45 r.p.m. records. They are normally contained within paper protective jackets in order to keep them clean and so that they are not damaged as a result of contact between adjacent records or handling. The protective jackets are of square shape, slightly larger than the diameter of the records, and are normally provided with a large central opening so that the title and other pertinent information printed on the record label may be visible. Typically, these single records are stored in a shop on horizontal shelves and there is no visible display; the records are sold as a result of specific customer request.

No fully acceptable means has heretofore been devised for efficiently displaying a plurality of such records in full attractive view in a limited area in order to promote impulse sales. A means for an efficient visible display of such records is disclosed in applicant's U.S. Pat. No. 3,027,012, issued Mar. 27, 1962. However, this patent does not teach a solution to the problem of maintaining the protective jacket in proper alignment with the record label so that the title and other pertinent information printed on said label are in full view and ensuring the proper orientation of said jacket so that any information printed thereon may be read without cocking one's head to the side.

Broadly, it is an object of this invention to provide a novel record rack construction in which phonograph records within their protective jackets may be displayed so that the record labels are in full view with the information printed thereon in a proper upright position for reading.

Specifically, it is an object of the present invention to provide a novel record rack construction in which 45 r.p.m. phonograph records within individual protective jackets are mounted on a display means in a vertical plane and said jackets are maintained in a proper upright position so that information printed thereon may be read and the record labels will be maintained in full view through the large central opening within said protective jacket.

In accordance with an illustrative embodiment demonstrating other objects and features of the present invention there is provided a flat, elongate backing member having spindle members projecting from one side thereof. The spindle members are of approximately the same cross-sectional area as the central apertures in 45 r.p.m. records with the exception that a projecting longitudinal key is formed on a portion of the spindle periphery. Said key cooperatively engages a notch in the periphery of the central aperture in a 45 r.p.m. record thereby enabling such record to be disposed in a vertical plane without any possibility of rotating while mounted on the spindle. Thus, pertinent information on the record label will be maintained in a suitable upright position for easy reading.

The backing member also has a plurality of pin members projecting therefrom on the same side as said spindles and each pin is disposed below an associated spindle such that the protective jackets of the 45 r.p.m. phonograph records mounted on the associated spindle rest on said pin. This prevents the protective jacket from slipping down over the record label and thereby maintains said label in full view through the large central aperture of the protective jacket. Furthermore, the positioning of the pin will enable the protective jackets and phonograph records enclosed therein to be oriented in any desired position.

The above brief description as well as further objects, features and advantages of the present invention will be more fully appreciated by reference to the following detailed description of a presently preferred but nonetheless illustrative embodiment in accordance with the present invention taken in conjunction with the accompanying drawing in which.

Figure 1:
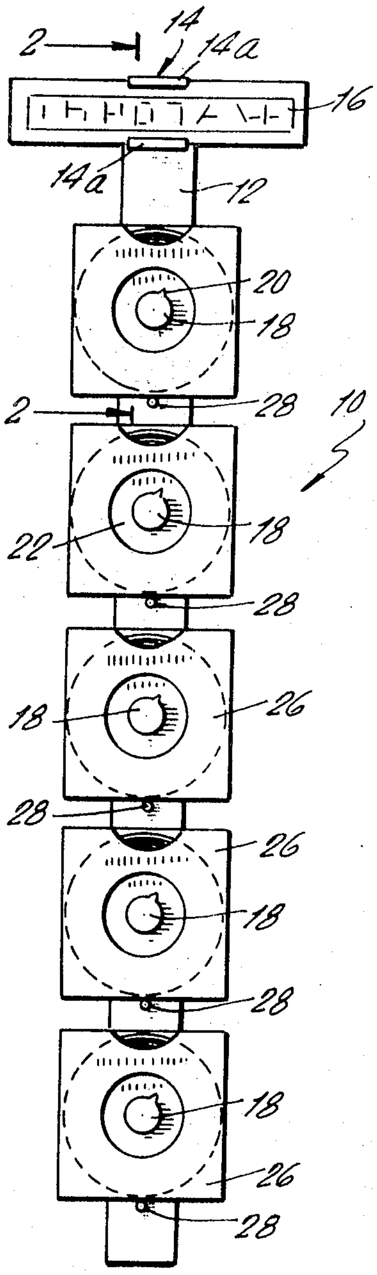
FIG. 1 is a front elevational view of a record rack constructed in accordance with the present invention and illustrating records mounted thereon in normal position.

Referring now to the drawings, and more particularly to FIG. 1 there is shown a record rack 10 constructed in accordance with the present invention and comprising a flat elongate backing member 12 which may be made of wood, plastic, metal or other suitable material and having a channel-like member 14 secured to the upper end portion thereof. As will be more clearly seen from FIG. 2, channellike member 14 comprises a holder having opposed curved edge portions 14a which are adapted to engage a sign 16 which may be of stiff cardboard or the like, and retain the same in fixed position at the upper portion of the elongate member 12.

A plurality of spindles 18 project from one side of said member 12. The spindles 18 are cylindrical and are of substantially circular cross-sectional configuration having a projecting key 20 thereon extending along the longitudinal length of each spindle. The keys 20 may be of substantially triangular cross-sectional configuration, however, the specific configuration is not critical.

Records 22, each having a central opening or aperture 24 which is of substantially the same area and configuration as the cross section of the spindles 18, are mounted on said spindles 18 such that a recess portion 24a on each record 22 engages the projecting key 20 on spindle 18 so that the record 22 is mounted on the spindle with no relative rotary movement possible between the spindle and the record engaged thereby or mounted thereon.

It is normally desirable to display the records 22 within their original jackets 26 to provide protection for the grooved portions of the record 22 when mounted on the rack 10 and to prevent possible abrasion of the records 22 as a result of their rubbing against one another without the protective jacket disposed therebetween.

A plurality of pin members 28 project from the elongate member 12 in spaced relation with said plurality of spindles 18 such that each pin cooperates with an associated spindle to provide a lower stop for the jackets 26 of the records 22 mounted on the associated spindles 18.

Figures 2, 3:
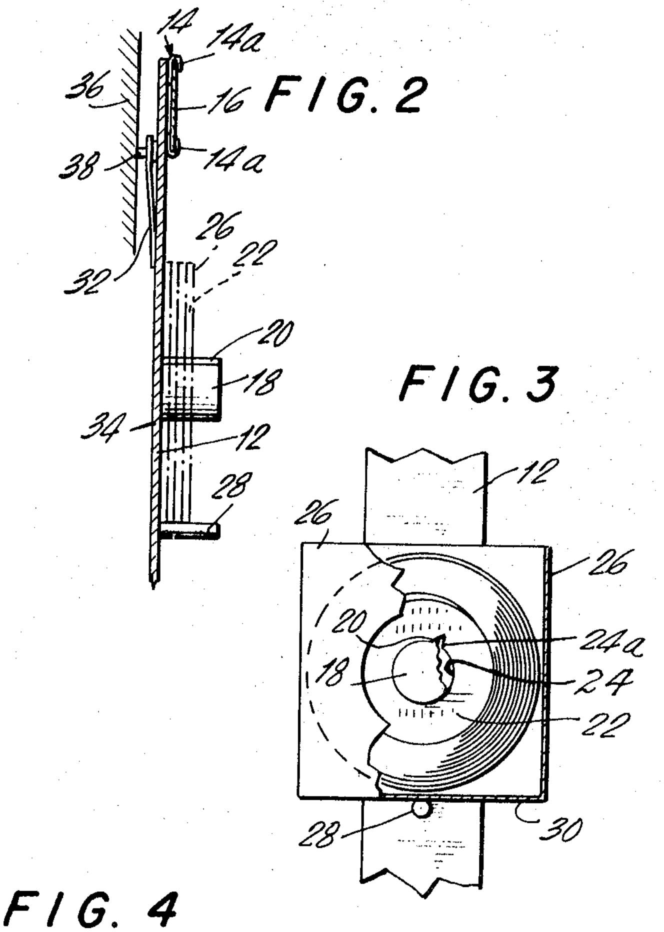
FIG. 2 is a fragmentary sectional view taken along line 2—2 of FIG. 1.
FIG. 3 is a fragmentary front elevational view, partly in section and in an enlarged scale, illustrating a record mounted on the spindle and the jacket resting on the pin member.

The jackets 26 have a large central aperture so that the record label may be visible when the record 22 is held within its jacket 26. While supporting the record 22 on spindle 18 through central aperture 24 and orienting the jacket 26 in an upright position to allow easy reading of the information printed thereon, the force of gravity will draw the jacket down until the upper portion of its central opening bears against the spindle 18 supporting record 22, thereby obscuring a portion of the record label. As shown in FIGS. 2 and 3, when records 22 in their individual jackets 26, are mounted on spindles 18, the bottom edge 30 of jacket 26 will bear against pin 28. In this manner, the jackets 26 may be disposed in an upright position to allow easy reading of the information printed thereon without having the jackets interfere with easy reading of the title and other pertinent information printed on the record label.

Figure 4:
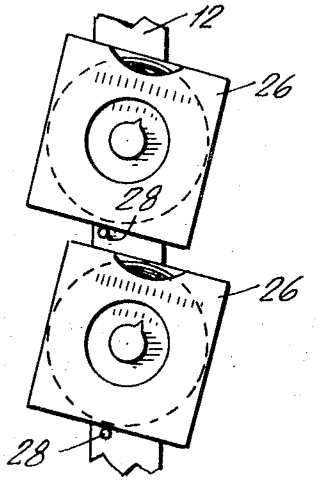
FIG. 4 is a fragmentary front elevational view similar to that shown in FIG. 1 but illustrating a different orientation of the record jackets.
Figure 5:
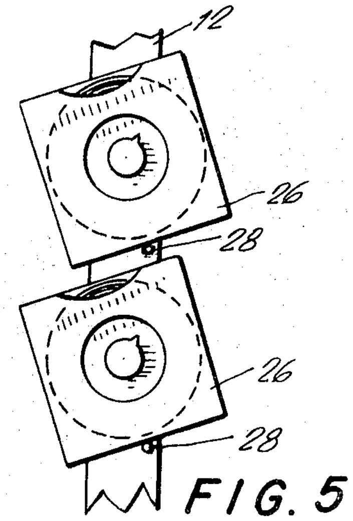
FIG. 5 is a fragmentary front elevational view similar to FIG. 4 illustrating still another orientation of the record jackets.

Other locations for pin 28 are illustrated in FIGS. 4 and 5 so that the labels may be oriented at a slight angle for a more aesthetic display of the records and associated jackets. Regardless of the position of pin 28, it is an important feature of the present invention that said pin 28 is positioned such that jacket 26 is not permitted to slip down over the record label obscuring a clear view of the title and other pertinent information printed thereon.

With reference to FIG. 2, the rack 10 may be provided with a hook member 32 secured to the rear face 34 of the elongate member 12 for mounting said rack 10 on a supporting structure such as wall 36. The hook member 32 would engage a nail or screw 38 secured to said wall 36.

It is understood that the longitudinally extending key 20 on spindle 18 is disposed such that, in conjunction with the notch 24A in record 22, the printed material on the record label identifying the title, orchestra, as well as other pertinent information, is in an upright position, or nearly so, in order that a person inspecting the record rack may readily examine the records and read the desired information without tortuous orientation of his head.

Although the invention has been described herein with specific reference to a record rack displaying records in a vertical alignment on one side of an elongate member 12, it is not intended to be limited strictly to such an embodiment. Spindle members 18 and pins 28 may project from both sides of the elongate member 12 and accordingly the records may be displayed on both sides of the rack. Similarly, the rack may contain several rows or columns of records without being limited to the single vertical display illustrated and disclosed above. In other respects as well, a latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. In a record rack display assembly for displaying phonograph records within their individual protective jackets in a vertical plane, each record having a central aperture, the combination comprising: a backing member having at least one spindle member and an associated pin member projecting therefrom, said pin member disposed below said spindle member a distance equal to slightly more than the radial length of said records, said spindle member having approximately the same cross-sectional area as the central aperture with a projecting longitudinal key formed thereon, each record having a notch formed in the peripheral portion of its central aperture for cooperatively engaging said longitudinal key to maintain each record in a fixed, nonrotatable position on said spindle member with the protective jacket resting on said associated pin member.

2. The display assembly of claim 1 including a plurality of spindle members projecting from one side of said backing member, each spindle member having a pin member cooperatively associated therewith.

3. The display assembly of claim 1 wherein said backing member comprises a flat elongate member and includes a plurality of spindle members projecting from opposite sides of said flat elongate member, each spindle member having an associated pin member projecting from said elongate member and vertically spaced from said spindle member.

* * * * *